United States Patent [19]

Wank

[11] 3,943,624

[45] Mar. 16, 1976

[54] METHOD OF MANUFACTURING A MAGNETIC HEAD

[75] Inventor: Larry Wank, Hunter, N.Y.

[73] Assignee: U. S. Philips Corporation, New York, N.Y.

[22] Filed: Jan. 24, 1975

[21] Appl. No.: 543,765

[52] U.S. Cl. ............................. 29/603; 65/43; 65/55; 65/58
[51] Int. Cl.² ........................................... G11B 5/42
[58] Field of Search ...... 29/603; 360/119, 120, 121; 65/43, 55, 58

[56] References Cited
UNITED STATES PATENTS

| | | | |
|---|---|---|---|
| 3,333,332 | 8/1967 | Vrolijks et al. | 29/603 |
| 3,395,450 | 8/1968 | Koorneef et al. | 29/603 |
| 3,579,214 | 5/1971 | Solyst | 29/603 |
| 3,843,541 | 10/1974 | Chiba et al. | 29/603 |

Primary Examiner—Carl E. Hall
Attorney, Agent, or Firm—Frank R. Trifari

[57] ABSTRACT

A method for manufacturing a magnetic head having at least one ferrite pole tip pair. The tips of each pair are separated by non-magnetic gap of a desired length and the method in accordance with the invention utilizes tips having generally planar surfaces. An elongated apex forming channel is formed in one of the pole tips and an elongated reservoir channel is formed in the same tip in generally parallel relationship. The reservoir channel is filled with glass and polished so that the glass therein extends in co-planar relationship to the generally planar surface of the tip having the reservoir channel therein. The generally planar surfaces are placed in opposed spaced relationship and a quantity of glass is disposed in the apex forming channel. All of the glass and both of the tips are heated until the glass from the channels flows into the space intermediate the generally planar faces of the tips.

9 Claims, 4 Drawing Figures

METHOD OF MANUFACTURING A MAGNETIC HEAD

BACKGROUND OF THE INVENTION

The invention relates to magnetic head structures and in particular to the magnetic gap portion of said structures. More specifically, the invention concerns a novel method of making a glass-gapped portion of the head.

Magnetic gap structures have been manufactured in a variety of ways using sintered ferromagnetic oxide which is most commonly known as ferrite. Normally a gap is provided between opposed planar surfaces otherwise known as pole tips of the magnetic transducing head. The fabrication of a glass spacer intermediate said faces is inherently very difficult since the distance between the opposed pole tip surfaces is typically in the order of 50 to 400 micro inches and also because a certain amount of diffusion and reaction takes place between molten glass and the ferrite which has a high solubility as to metallic oxides generally in molten glass. It is desirable to minimize such solubility and erosion of the faces to thereby avoid an irregular undefined transducing gap where there is no clear line of demarcation between the end of the magnetic ferrite and the beginning of non-magnetic glass gap. More particularly the flatness and parallelism of the faces are critical.

One method known in the prior art to avoid erosion or diffusion between the glass and the ferrite is to use a low temperature glass. A disadvantage of this method is that the glass which has a low temperature melting point inherently is softer and the polishing of the glass results in surface irregularity.

A trend in the art is to use higher melting or softening point glasses as the gap glass for a glass bonded ferrite recording head and to introduce the glass into the gap by means of capillary flow. The higher temperature glass is desirable because it is harder after cooling and accordingly more nearly matches the hardness of the ferrite. This is desirable too since the customary polishing operation will fail to irregularly affect the glass and the ferrite. In addition the higher temperature glass also avoids the problem of a change in the gap spacing if the glass bonded pole piece is sealed or potted in a second stage sealing operation to a support such as a disk file slider bearing. A problem with such higher temperature glass is however, that as the glass melting or softening point increases, the higher the temperature required for capillary flow and the increased likelihood of dissolution or erosion of the polished pole faces by the flowing glass as well as the increased likelihood of bubbles in the glass which are undesirable because of the decreased structural strength.

Efforts have been made in the art to reduce these problems by achieving capillary flow at the lowest possible temperature and in the shortest time interval.

One approach described in Burch et al. U.S. Pat. No. 3,824,685 is to sputter a thin layer of glass onto one or more discrete portions of a planar surface of each of two ferrite members. Thereafter the pole pieces are assembled and the remaining gap is filled by capillary flow in part from the apex. The quantity of glass drawn into the gap by capillary action is apparently aided by a reduced resistance to capillary flow provided by the softened glass layers within the gap. This approach is expensive because of the necessity of a separate sputtering step involving expensive equipment.

Other United States Patents disclosing a method having a very general similarity to the method in accordance with the invention include: Alex et al., U.S. Pat. No. 3,795,954; Maissel et al. U.S. Pat. No. 3,458,926; Duinker et al. U.S. Pat. No. 3,233,308; and Secrist U.S. Pat. No. 3,577,634. Also having a general relationship to the present invention is IBM Technical Disclosure Bulletin Volume 6 No. 4 September 1973 page 11.

It is a primary object of the invention to provide a method for depositing high temperature glass in the gap intermediate ferrite magnetic heads at the lowest possible temperature and in the least possible time.

It is another object of the invention to provide such a method which will not require the expense inherent in the use of sputtering, evaporation or similar deposition equipment.

SUMMARY OF THE INVENTION

It has now been found that these and other objects of the invention may be attained by a method for manufacturing a magnetic head having at least one ferrite pole tip pair with the tips of each pair being separated by a glass gap of a desired length. Initially each pole tip has formed thereon a generally planar gap side. Thereafter an elongated apex forming channel is formed in one of the tips which communicates with the generally planar surface of that tip and an elongated reservoir channel is formed in the same tip in accordance with this form of the invention. The reservoir channel is disposed in communication with the generally planar surface of said tip in which it is disposed and is generally parallel to the apex channel.

Thereafter a quantity of high temperature glass is melted into the reservoir channel, allowed to solidify, and then the surface of the glass in the reservoir channel is polished until the glass in the reservoir channel is coplanar with the generally planar surface of the tip in which the reservoir is disposed. The tips are placed with the generally planar faces thereof in opposed spaced relationship and then a quantity of high temperature glass is positioned at the apex forming channel. The tips and all of the glass is then heated until the glass flows by capillary action into the space between the opposed generally planar surfaces of the tips to form a unitary assembly.

In various forms of the invention the method normally includes the step after said heating step of cutting said tips in a plane generally perpendicular to said generally planar surfaces and intermediate the apex channel and the reservoir channel to sever the reservoir channel from the assembly. This step may be accomplished either by the manufacturer or the customer of the manufacturer. In one form the glass utilized will have a softening point in the range of 500° to 950° C. The forming step may be accomplished by grinding and the apex channel may have a generally planar surface extending obliquely away from the generally planar surface.

The quantity of glass added to the reservoir channel will completely fill that channel. Normally it will be filled and polished to be flush with the face generally generally plane face thereof. The quantity of glass positioned in the apex normally will be disposed there in the form of a glass rod. The reservoir channel normally will have a generally rectangular cross-section and will have a wall parallel to said generally planar surface which is longer to a direction parallel to the generally planar surface than the adjacent wall dimension in a direction perpendicular to the generally planar surface.

BRIEF DESCRIPTION OF THE DRAWING

The invention will be better understood by reference to the accompanying drawing in which.

DESCRIPTION OF THE PREFERRED EMBODIMENT

Figure 1:
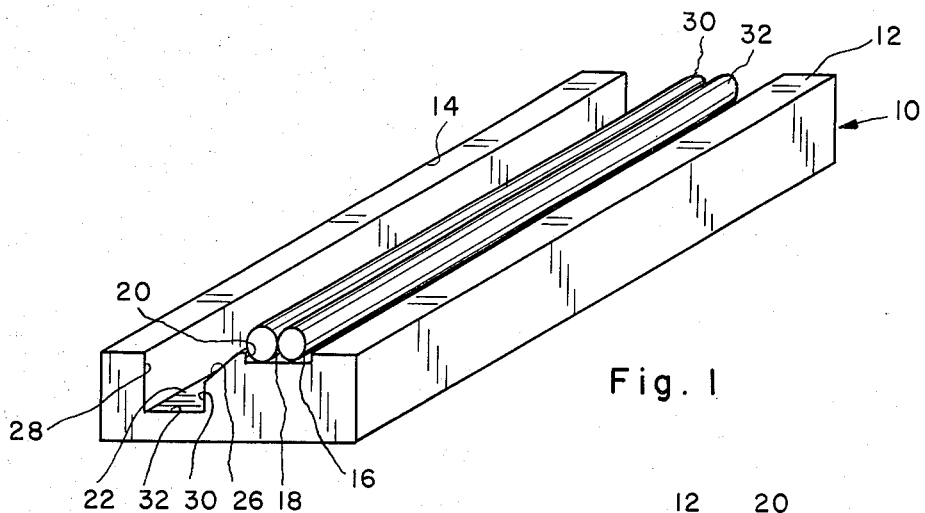
FIG. 1 is a perspective view of one pole tip in accordance with one form of the invention.
Figure 2:
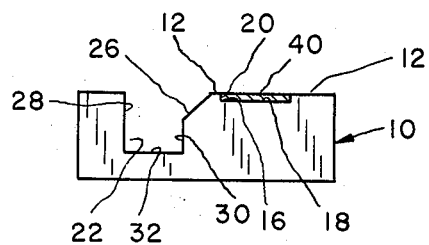
FIG. 2 is a side elevational view of the pole tip shown in FIG. 1 after the glass rods shown in FIG. 1 have been melted down and the surface thereof has been polished.

Referring now to FIGS. 1 and 2 there is shown a pole tip 10. The pole tip 10 is normally formed with a generally planar face 12 which in the preferred embodiment is coplanar with the generally planar surface 14. Disposed in the generally planar surface 12 is a generally rectangular reservoir channel 16 having a wall 18 parallel to the generally planar surface 12 which is longer than the walls 20 which extend generally perpendicular to the generally planar surface 12. The geometric relationship is best seen in FIG. 2 which shows clearly that wall 18 is "longer" than wall 20.

An apex forming channel 22 is disposed in generally parallel relationship to the reservoir channel 16 and has a generally planar surface 26 extending obliquely with respect to the generally planar surface 12. It will be understood that the cooperation between surface 26 and the surface 11 of a second pole piece 13 is the commonly used apex construction. Walls 28, 30 are disposed generally perpendicular to the generally planar surface 12 and a wall 32 is generally parallel to the generally planar surface 12. Ordinarily the surfaces in the pole piece will be produced by grinding although other means of forming the material, which ordinarily will be a ferrite, are possible.

In accordance with the method of the invention glass which ordinarily will be a high temperature glass because of its preferred physical properties is melted into the reservoir channel 16. This is preferably accomplished by positioning a quantity of glass such as glass rods 30, 32 within the reservoir channel 16. Frequently a small quantity of heated acrylic resin such as that sold under the trademark Lucite may be positioned at the axial extremities of the glass rod 30, 32 to avoid inadvertent dropping of the rod from the reservoir channel 16. It will be understood that the trademark Lucite is owned by E. I. DuPont de Nemours & Company and that the material is an acrylic resin.

Figure 3:
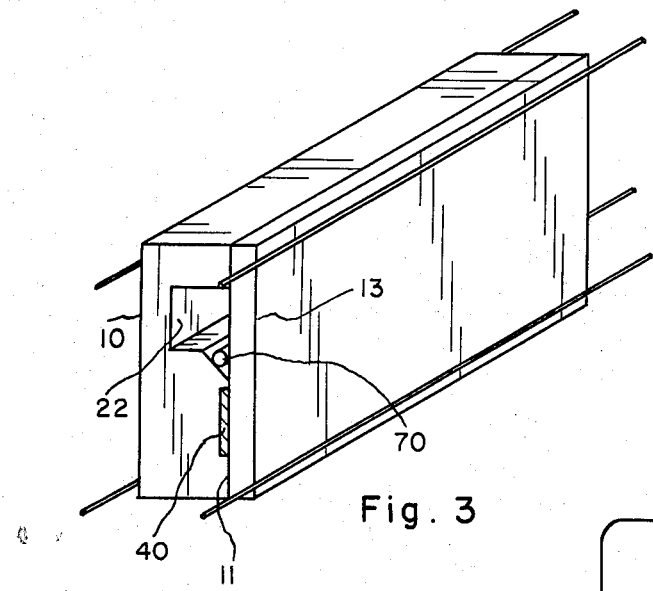
FIG. 3 is a perspective view of a pair of pole tips in accordance with the invention.

Thereafter in accordance with the invention the pole piece 10 is positioned in a furnace and heated until the glass rods 30, 32 become sufficiently soft to flow into the reservoir channel 16. Thereafter as best seen in FIG. 2 the pole piece 10 is polished along the upper surface 40 of the glass which was formerly in the form of the glass rods 30, 32. More particularly this surface 40 will be polished until it is coplanar with the generally planar surface 12. Those skilled in the art would recognize the necessity for great precision in terms of flatness of this surface to insure precise spacing of the pole piece 10 shown in FIG. 3.

Figure 4:
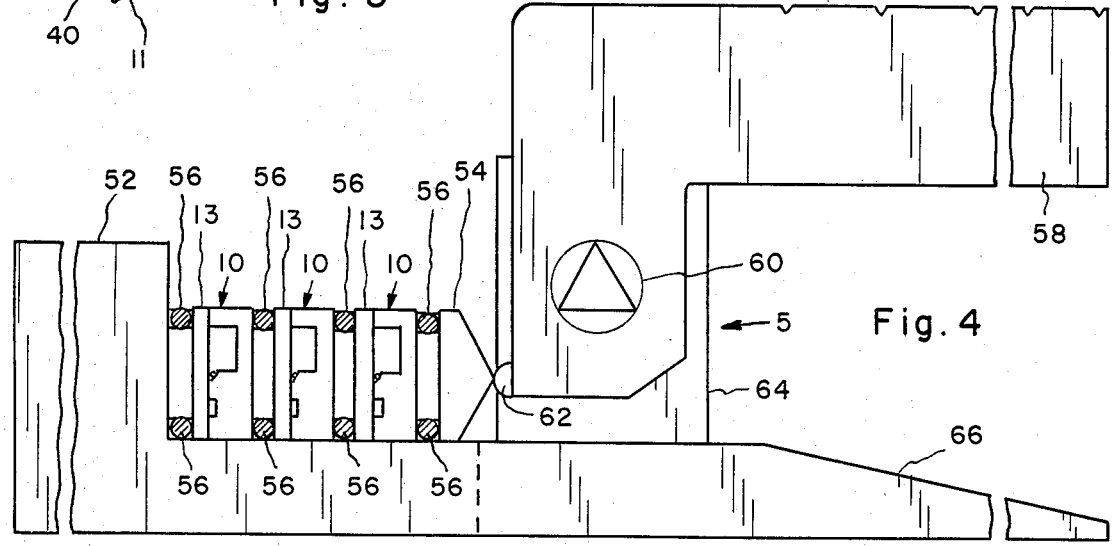
FIG. 4 is an elevational view of a plurality of pairs of pole tips carried in a fixture adapted for holding the plurality of pole tips during a heating process.

The pole piece 10 is positioned with the generally planar surface 12 thereof in spaced opposed relationship to a generally planar surface 11 of a second pole piece 13. Ordinarily the spacing will be in the order of 50 to 400 micro inches and a fixture will ordinarily be provided for holding the pole pieces 10 and 13 together. One such fixture 50 is shown in FIG. 4 wherein a plurality of pole pieces 10, 13 are held together by means of a jaw 52 which cooperates with an elongated member 54. Spacers 56 are disposed intermediate each pair of pole tips. The arm 58 is carried for pivotal motion about pivot 60 and has an upstanding rounded boss 62 for cooperation with the member 54. The pivot 60 is carried on an upstanding post 64 which is carried on a base 66 as is the jaw 52.

Further in accordance with the invention, a glass rod 70 is placed within the apex channel 22 and the pair of pole tips 10, 12 together with the glass in the reservoir channel 40 and the glass rod 70 are placed within an oven. Ordinarily shims (not shown) will be disposed intermediate the generally planar surfaces 12, 11 of the pole tips 10, 13 to provide the necessary spacing therebetween. In addition ordinarily a quantity of Lucite will be positioned intermediate the pole tips to avoid slippage therebetween during the heating step. Thereafter the heating of the two pole tips and the glass will provide a flow of glass into the space between the generally planar surfaces of the pole tips 10, 13. The precise mechanism by which the flow of glass into the gap between the surfaces of the pole tips is not clear but it is believed to be not merely the result of capillary action. The flow of glass normally occurs from the reservoir before flowing from the apex channel. Much of the glass disposed in the apex channel ordinarily is used to form the fillet at the apex in the conventional manner. It is found that the method in accordance with the invention produces a magnetic head at a lower temperature, in less time and at significantly reduced cost over the prior art methods. It will be understood that for most applications it will be desirable to make a cut generally perpendicular to the generally planar surfaces and intermediate the reservoir channel and the apex channel so that the final pole tips which are used commercially will not have the reservoir channel remaining therein. For other applications the presence of the reservoir channel in the product sold to the customer will not be detrimental and the reservoir channel may be left within the structure which is marketed and thereafter cut by the customer. It will be further understood that normally the pole pieces as referred to herein will be further cut in a series of planes generally perpendicular to the generally planar surface 12 to produce a plurality of pole pairs. Ordinarily the apex forming channel and the reservoir channel will be disposed in the same pole piece although it is within the spirit of the invention to alter this arrangement.

Having thus described my invention I claim:

1. A method for manufacturing a magnetic head having at least one pole tip pair, the tips of each pair being separated by a non-magnetic gap of a desired length, the steps comprising:

forming a generally planar gap side surface in each of said pole tips;

forming an elongated apex forming channel in one of said pole tips, said apex forming channel communicating with said generally planar gap side surface of said tip;

forming an elongated reservoir channel in one of said tips; said reservoir channel being in communication with said generally planar surface of said tip in which it is disposed, said reservoir channel being disposed in generally parallel relationship to said apex channel;

melting a quantity of glass into said reservoir channel;

polishing said one tip having said reservoir channel therein until no glass extends out of said reservoir channel above said generally planar surface of said tip;

placing both of said pole tips with said generally planar faces thereof in opposed spaced relationship;

positioning a quantity of glass in said apex channel; and heating each of said tips and all of said glass until said glass in said reservoir channel and said apex channel flows into the space between said opposed generally planar surfaces of said tips to form a unitary assembly.

2. The method as described in claim 1 further including the step after said heating step of cutting said tips in a plane generally perpendicular to said generally planar surfaces and intermediate said apex channel and said reservoir channel to sever said reservoir channel from said assembly.

3. A method as described in claim 1 wherein said glass has a softening point in the range of 500°–950° C.

4. The method as described in claim 1 wherein said forming steps are accomplished by grinding.

5. The method as described in claim 1 wherein said apex channel has a second generally planar surface extending obliquely away from said generally planar surface.

6. The method as described in claim 1 wherein the quantity of glass added to said reservoir channel completely fills said channel.

7. The method as described in claim 1 wherein said quantity of glass positioned in said apex reservoir is disposed there in the form of a glass rod.

8. The method as described in claim 1 wherein said reservoir channel has a generally rectangular cross-section.

9. The method as described in claim 8 wherein said reservoir channel has a wall parallel to said generally planar surface which is longer in a direction parallel to said generally planar surface than the adjacent wall dimension in a direction perpendicular to said generally planar surface.

* * * * *

UNITED STATES PATENT AND TRADEMARK OFFICE
CERTIFICATE OF CORRECTION

PATENT NO. : 3,943,624
DATED : March 16, 1976
INVENTOR(S) : LARRY WANK

It is certified that error appears in the above–identified patent and that said Letters Patent are hereby corrected as shown below:

IN THE TITLE PAGE

Section [73] "Assignee: U.S. Philips Corporation" should be --Section [73] Assignee: FERROXCUBE CORPORATION--.

IN THE SPECIFICATION

Column 2, line 63, "filled and polished to be flush with the face generally" should be --filled and polished to be flush with the face--.

Signed and Sealed this twenty-ninth Day of June 1976

[SEAL]

Attest:

RUTH C. MASON
*Attesting Officer*

C. MARSHALL DANN
*Commissioner of Patents and Trademarks*